United States Patent [19]

Schimmel et al.

[11] Patent Number: 4,629,614
[45] Date of Patent: Dec. 16, 1986

[54] PROCESS FOR DECONTAMINATING PHOSPHORIC ACID

[75] Inventors: Günther Schimmel; Reinhard Gradl, both of Erftstadt, Fed. Rep. of Germany

[73] Assignee: Hoechst Aktiengesellschaft, Fed. Rep. of Germany

[21] Appl. No.: 794,507

[22] Filed: Nov. 4, 1985

[30] Foreign Application Priority Data

Nov. 17, 1984 [DE] Fed. Rep. of Germany ....... 3442142

[51] Int. Cl.$^4$ .............................................. C01B 25/16
[52] U.S. Cl. ............................. 423/321 R; 423/321 S
[58] Field of Search ................ 423/321 R, 166, 321 S, 423/320

[56] References Cited

U.S. PATENT DOCUMENTS

| 4,285,921 | 8/1981 | Mamourian et al. | 423/321 S |
| 4,315,899 | 2/1982 | Mamourian et al. | 423/321 S |
| 4,457,899 | 7/1984 | Grotyohann et al. | 423/321 R |
| 4,466,948 | 8/1984 | Schimmel et al. | 423/321 R |
| 4,479,924 | 10/1984 | Plessen et al. | 423/321 R |
| 4,539,192 | 9/1985 | Schimmel et al. | 423/321 S |

Primary Examiner—Gregory A. Heller
Attorney, Agent, or Firm—Connolly and Hutz

[57] ABSTRACT

Wet-process phosphoric acid prepurified by liquid/liquid extraction with an organic solvent is decontaminated. To this end, the prepurified acid is first freed from residual extractant, then stripped with steam or hot gas, contacted with a dialkyldithiophosphoric acid ester and a fine particulate adsorbent, and liquid phase material is ultimately treated with steam and hydrogen peroxide.

6 Claims, No Drawings

PROCESS FOR DECONTAMINATING PHOSPHORIC ACID

The present invention relates to a process for freeing wet-process phosphoric acid prepurified by conventional liquid/liquid extraction, from contaminants, e.g. arsenic, fluorine and organic compounds.

It has already been described (cf. German Specification No. De-A-3 227 202), which corresponds to U.S. Pat. No. 4,466,948, issued to Schimmel et al on Aug. 21, 1984 that crude (i.e. not previously purified) wetprocess phosphoric acid can be freed from heavy metal ions and arsenic by treating the acid, at a temperature between 10° and 100° C., initially with a diorganyldithiophosphoric acid ester and then with an adsorbent, and the purified phosphoric acid is ultimately separated from the ester and adsorbent. More especially, wet-process phosphoric acid is treated with the diorganyldithiophosphoric acid ester at a temperature higher than 50° C., and with the adsorbent at a temperature lower than 50° C.

It has also been disclosed that wet-process phosphoric acid pretreated by an extraction method can be freed simultaneously from fluorine and organic compounds. To this end, the phosphoric acid is introduced, in a single step, into the upper portion of a closed container, treated therein at a temperature of 120°–180° C. and under a pressure higher than 1 bar with steam flowing countercurrently with respect to the acid, and the acid so treated is collected in the lower portion of the container in which it is reacted with hydrogen peroxide. Vaporous matter containing fluorine is removed overhead and purified phosphoric acid is taken from the lower portion of the container (cf. German Specification No. P 33 25 121.5-41), corresponding essentially to U.S. Pat. No. 4,539,192, issued to Schimmel et al, on Sept. 3, 1985.

This art-recognized method of removing arsenic from crude phosphoric acid with the use of a dialkyldithiophosphoric acid ester is, however, not directly of assistance in the decontamination of prepurified—especially by extraction—phosphoric acid as the two acid grades contain widely different secondary constituents.

Crude acids contain relatively large proportions of heavy metal cations which are liable to catalyze the decomposition of the ester with liberation of $H_2S$ needed for precipitating As, and on the other hand, to bind, in form of heavy metal sulfides, the $H_2S$ set free.

As compared therewith, extractively purified phosphoric acids are substantially free from heavy metal cations, with the exception of arsenic. In other words, the acid is free from constituents catalyzing the decomposition of the ester. As is known, however, arsenic is partially separated in form of arsenic sulfide on subjecting the acid to treatment with a dithiophosphoric acid ester. In addition, it is not allowable for pure phosphoric acid to contain even traces of $H_2S$ originating from the dearsenification with the use of a dithioester, as such acid would not be odorless. As can be inferred, the goal aimed at cannot be achieved by subjecting an extractively purified acid to treatment just with a dithiophosphoric acid ester.

We have now unexpectedly found that pure phosphoric acid practically free from arsenic, fluorine, organic contaminants and also $H_2S$ can be obtained from wet-process phosphoric acid prepurified with an organic solvent. To this end, the invention provides for wet-process phosphoric acid prepurified by liquid/liquid-extraction with an organic solvent to be freed initially from residual extraction by stripping with steam or hot gas, and for it to be then contacted with dialkyldithiophosphoric acid ester and a fine-particulate adsorbent with the resultant formation of a dispersion; for solid matter to be separated from the dispersion and for the liquid phase material to be freed simultaneously from fluorine and organic contaminants by treating it, in a single step, with steam and hydrogen peroxide.

The prepurified wet-process phosphoric acid used as feed material should conveniently contain 26 to 35 wgt % $P_2O_5$ and 0.1–1.0 wgt % residual extractant. Preferably, however, wetprocess phosphoric acid stripped with steam or hot gas and containing less than 0.02 wgt % residual extraction should be used.

Further preferred features of the process of this invention provide:

(a) for the wet-process phosphoric acid freed from residual extractant to be first evaporated to a $P_2O_5$-concentration of 40–85 wgt % and for it to be then contacted with the dialkyldithiophosphoric acid ester and adsorbent;

(b) for the wet-process phosphoric acid to be contacted with the dialkyldithiophosphoric acid ester at a temperature of 50°–80° C.; and (c) for the liquid phase material remaining after separation of solid matter from the dispersion to be introduced into the upper portion of a closed container, to be treated therein at a temperature of 120°–180° C. under a pressure higher than 1 bar with steam flowing countercurrently with respect to the liquid phase material, for the liquid phase material to be collected in the lower portion of the container and for it to be reacted with hydrogen peroxide, for vaporous matter containing fluorine to be removed overhead, and for purified phosphoric acid to be taken from the lower portion of the container.

It has unexpectedly been found that the steps of first stripping the feed acid and then dearsenifying it by means of a dialkyldithiophosphoric acid ester permit the acid to be considerably more deconcentrated in As than heretofore (cf. Examples 1 and 2 hereinafter); in addition, by first dearsenifying the acid with the dialkyldithiophosphoric acid ester, it is possible considerably to reduce the $C_{org.}$ constituents during the following steam/hydrogen peroxide-treatment stage (cf. Examples 5 and 6 hereinafter); in other words, it is possible by the combination of processing steps in accordance with this invention critically to improve the purity of wetprocess phosphoric acids prepurified by extraction.

Speaking generally, the process of this invention is carried out approximately as follows:

Phosphoric acid extractively purified with an amyl alcohol and re-extracted is obtained, e.g. with a $P_2O_5$-concentration of 26–35 wgt % and an amyl content of 0.1–1.0 wgt %.

The acid is introduced into a suitable column, stripped with steam at atmospheric pressure or under a slight vacuum and its alcohol content is thereby reduced to 0.02 wgt %. Next, it is preferable for the acid to be concentrated under vacuum in a plurality of steps in a evaporator and commercial acid containing about 60 wgt % $P_2O_5$, 50–500 ppm fluorine, 50–200 ppm $C_{org.}$ and 2–20 ppm arsenic, depending on the origin of the ore, is obtained.

The acid so obtained is ultimately treated with a dialkyldithiophosphoric acid ester, which preferably is bis(2-ethylhexyl) ester, at 50°–80° C. over a period of 10–100 minutes. An adsorbent, preferably an acid-insoluble fine particulate silicate, is added and the whole is filtered.

The filtrate is introduced while hot into a heat exchanger, heated therein and fed to the head of a pressure-resistant stripping column provided with inserts. Steam is introduced thereinto from below, countercurrently with respect to the filtrate, and vaporous matter containing fluorine is condensed overhead in a condenser.

Perhydrol is introduced, co-currently with respect to the prepurified acid into the still of the column, provided with a stirring means and filled with steam-treated acid. A temperature of 140°–160° C. should preferably be established inside the column. A clear, light, and odorless acid is ultimately taken from the column via a suitable outlet system.

The process of this invention offers a series of advantages:

1. Extremely pure phosphoric acid is obtained (less than 10 ppm F, less than 10 ppm $C_{org.}$, less than 0.1 ppm arsenic)
2. The dearsenification has various technically beneficial effects:
   (a) the liquid dialkyldithiophosphoric acid ester is an easy-to-handle reagent;
   (b) an extremely minor quantity of ester is required to be used;
   (c) there is no appreciable $H_2S$-evolution; (d) the reaction can be effected in an agitator-provided vessel;
   (e) the arsenic is easy to separate by filtration.
3. During the steam-stripping stage, the acid is freed from fluorine and simultaneously from traces of residual $H_2S$.
4. During the $H_2O_2$-treatment stage, the acid is freed from traces of residual dialkyldithiophosphoric acid ester. Altogether less oxidant is required to be used than without prior dearsenification with the use of dialkyldithiophosphoric acid ester/fine particulate adsorbent.

The following Examples illustrate the invention which is naturally not limited thereto.

EXAMPLE 1 (COMPARATIVE EXAMPLE)

Wet-process phosphoric acid purified by extraction and reextracted with water was analyzed and found to contain: 32.5 wgt % $P_2O_5$; 595 ppm F; 0.5 wgt % amyl alcohol; 7 ppm As. The acid was stirred for 1 hour at 60° C. with 0.05 wgt %, based on $P_2O_5$, bis(2-ethylhexyl)dithiophosphoric acid ester, and then for 5 minutes with 0.2 wgt %, based on $P_2O_5$, of commercially available perlite. After filtration under pressure using a precoat-layer, the acid was found to still contain 0.7 ppm As. The other analytical data were unchanged.

EXAMPLE 2

Steam was passed over a period of three hours at 95° C. through the re-extracted acid used in Example 1. The acid so treated then contained 32.3 wgt % $P_2O_5$, 47 ppm $C_{org.}$, 410 ppm F and 7 ppm As. Next, the acid was treated as described in Example 1 with the ester and perlite. It then contained 0.08 ppm As.

EXAMPLE 3 (COMPARATIVE EXAMPLE)

The phosphoric acid of Example 1 was concentrated at 110° C. under 105 millibars. The resulting acid contained 60.8 wgt % $P_2O_5$, 400 ppm $C_{org.}$, 140 ppm F and 13 ppm As.

The acid so obtained was stirred for 1 hour at 60° C. with 0.05 wgt %, based on $P_2O_5$, bis (2-ethylhexyl)dithiophosphoric acid ester and then for 5 minutes with 0.1 wgt %, based on $P_2O_5$, commercially available perlite. After filtration under pressure using a precoat-layer, the acid was found to contain 0.2 ppm As and 350 ppm $C_{org.}$. The other data were unchanged.

EXAMPLE 4

The previously stripped phosphoric acid of Example 2 was concentrated as described in Example 3. The acid was analyzed and found to contain: 60.1 wgt % $P_2O_5$; 105 ppm $C_{org.}$; 115 ppm F and 13 ppm As. Next, the acid was dearsenified as described in Example 3 and found to contain 90 ppm $C_{org.}$ and 0.05 ppm As; the other data were unchanged

EXAMPLE 5 (COMPARATIVE EXAMPLE)

Phosphoric acid stripped and concentrated as described in Example 4 was heated to 150° C. in a heat exchanger and introduced into a pressure-resistant column. Steam flowing countercurrently with respect to the acid, was injected into the column under a pressure of 6 bars. The acid was collected in the agitator-provided still of the column and treated with $H_2O_2$. Purified phosphoric acid containing 60.0 % $P_2O_5$, 10 ppm $C_{org.}$, 13 ppm As and 8 ppm F was taken from the column.

EXAMPLE 6

Phosphoric acid stripped and concentrated as described in Example 4 and also dearsenified was introduced into the pressure-resistant column of Example 5 and treated with steam and $H_2O_2$.

Acid clear as water which contained 59.9% $P_2O_5$, 5 ppm $C_{org.}$, 7 ppm F and 0.05 ppm As was obtained.

This was acid of food quality.

We claim:

1. In a process for removal of residual impurities as arsenic, fluorine and organic contaminants from wet-process phosphoric acid prepurified by liquid/liquid extraction with an organic solvent as extractant the improvement comprising the steps:
   (a) freeing the prepurified acid from residual extractant by stripping with steam or hot gas;
   (b) contacting then the stripped acid with dialkyldithiophosphoric acid ester and a fine particulate adsorbent with the resultant formation of a dispersion;
   (c) separating solid matter from the dispersion;
   (d) and treating the remaining liquid phase simultaneously with steam and hydrogen peroxide and thereby removing fluorine and organic contaminants in a single step from the said liquid phase.
2. The process as claimed in claim 1, wherein the prepurified wet-process phosphoric acid used as the feed acid contains 26–35 wgt % $P_2O_5$ and 0.1–1.0 wgt % residual extractant.
3. The process as claimed in claim 1, wherein the wet-process phosphoric acid prepurified by stripping with steam or hot gas contains less than 0.02 wgt % residual extractant.

4. The process as claimed in claim 1, wherein the wet-process phosphoric acid freed from residual extractant is first evaporated to a $P_2O_5$-concentration of 40–85 wgt % and then contacted with the dialkyldithiophosphoric acid ester and adsorbent.

5. The process as claimed in claim 1, wherein the wet-process phosphoric acid is contacted with the dialkyldithiophosphoric acid ester at a temperature of 50°–80° C.

6. The process as claimed in claim 1, wherein the liquid phase remaining after separation of solid matter from the dispersion, is introduced into the upper portion of a closed container, treated therein at a temperature of 120° to 180° C. under a pressure higher than 1 bar with steam flowing countercurrently with respect to the liquid phase, the liquid phase so treated is collected in the lower portion of the container and reacted with hydrogen peroxide, vaporous matter containing fluorine is removed overhead, and purified phosphoric acid is removed from the lower portion of the container.

* * * * *